US012809031B2

(12) United States Patent
Fischer

(10) Patent No.: US 12,809,031 B2
(45) Date of Patent: Nov. 24, 2026

(54) LIDAR SENSOR FOR A VEHICLE, HAVING A RECEIVING ELEMENT FOR FOCUSING IN A FOCAL POINT REGION, VEHICLE COMPRISING A LIDAR SENSOR, AND METHOD FOR OPERATING A LIDAR SENSOR

(71) Applicant: Bayerische Motoren Werke Aktiengesellschaft, Munich (DE)

(72) Inventor: Jonathan Fischer, Huettlingen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 497 days.

(21) Appl. No.: 18/287,200

(22) PCT Filed: Mar. 23, 2022

(86) PCT No.: PCT/EP2022/057603
§ 371 (c)(1),
(2) Date: Oct. 17, 2023

(87) PCT Pub. No.: WO2022/223226
PCT Pub. Date: Oct. 27, 2022

(65) Prior Publication Data

US 2024/0201388 A1 Jun. 20, 2024

(30) Foreign Application Priority Data

Apr. 19, 2021 (DE) ..................... 10 2021 109 727.4

(51) Int. Cl.
*G01S 17/931* (2020.01)
*G01S 7/481* (2006.01)

(52) U.S. Cl.
CPC .......... *G01S 17/931* (2020.01); *G01S 7/4816* (2013.01); *G01S 7/4817* (2013.01); *G01S 7/4818* (2013.01)

(58) Field of Classification Search
CPC .... G01S 17/931; G01S 7/4816; G01S 7/4817; G01S 7/4818; G01S 17/42; G01S 17/88
See application file for complete search history.

(56) References Cited

U.S. PATENT DOCUMENTS 5,363,463 A 11/1994 Kleinerman
6,507,392 B1 * 1/2003 Richards .............. F41G 7/2293 250/203.1

(Continued)

FOREIGN PATENT DOCUMENTS

CN 107966704 A 4/2018
CN 110879385 A 3/2020

(Continued)

OTHER PUBLICATIONS

International Search Report (PCT/ISA/210) issued in PCT Application No. PCT/EP2022/057603 dated Jul. 6, 2022 with English translation (4 pages).

(Continued)

*Primary Examiner* — Joshua D Huson
*Assistant Examiner* — Vicente Rodriguez
(74) *Attorney, Agent, or Firm* — Crowell & Moring LLP

(57) ABSTRACT

A lidar sensor for a vehicle includes an optical transmitting device for scanning an environment of the vehicle within a predefined sensing region by individual laser beams. The lidar sensor also includes an optical receiving device having a receiving element for receiving the individual laser beams reflected in the environment and a detector for converting the reflected individual laser beams into an electrical signal. In addition, the lidar sensor includes an evaluation device for determining a representation of the environment in the sensing region based on the electrical signal. Furthermore, the receiving element includes at least one optical lens configured to focus, in a predefined focal point region, the individual laser beams reflected back to the at least one (Continued)

optical lens from the entire sensing region. Moreover, the detector is configured to convert the individual laser beams focused in the focal point region into the electrical signal.

8 Claims, 3 Drawing Sheets

(56) References Cited

U.S. PATENT DOCUMENTS

| | | | | |
|---|---|---|---|---|
| 6,629,784 | B1 | 10/2003 | Bricheno et al. | |
| 6,856,456 | B2 * | 2/2005 | Hildebrand .......... | H04B 10/118 359/349 |
| 7,982,662 | B2 * | 7/2011 | Shaffer ................. | G01S 7/4813 250/203.1 |
| 9,069,059 | B2 | 6/2015 | Vogt et al. | |
| 9,831,630 | B2 | 11/2017 | Lipson | |
| 2011/0006943 | A1 | 1/2011 | Shaffer | |
| 2015/0219764 | A1 | 8/2015 | Lipson | |
| 2018/0106901 | A1 | 4/2018 | Frederiksen et al. | |
| 2018/0128920 | A1 | 5/2018 | Keilaf et al. | |
| 2020/0200880 | A1 * | 6/2020 | Stoppel ................. | G01S 7/4814 |

FOREIGN PATENT DOCUMENTS

| | | | |
|---|---|---|---|
| DE | 38 07 077 | A1 | 4/1989 |
| DE | 10 2013 012 787 | A1 | 2/2015 |
| DE | 10 2014 118 056 | A1 | 6/2016 |
| DE | 10 2017 124 633 | A1 | 4/2019 |
| DE | 10 2017 129 100 | A1 | 6/2019 |
| DE | 10 2018 222 416 | A1 | 6/2020 |
| EP | 3 495 845 | A1 | 6/2019 |
| WO | WO 2020/143542 | A1 | 7/2020 |

OTHER PUBLICATIONS

German-language Written Opinion (PCT/ISA/237) issued in PCT Application No. PCT/EP2022/057603 dated Jul. 6, 2022 with English translation (12 pages).

German Search Report issued in German Application No. 10 2021 109 727.4 dated Sep. 1, 2023 with partial English translation (18 pages).

German-language Office Action issued in German Application No. 10 2021 109 727.4 dated Feb. 18, 2026 (6 pages).

Chinese-language Office Action issued in Chinese Application No. 202280027872.X dated May 28, 2026, with English translation (18 pages).

* cited by examiner

LIDAR SENSOR FOR A VEHICLE, HAVING A RECEIVING ELEMENT FOR FOCUSING IN A FOCAL POINT REGION, VEHICLE COMPRISING A LIDAR SENSOR, AND METHOD FOR OPERATING A LIDAR SENSOR

BACKGROUND AND SUMMARY

The present invention relates to a lidar sensor for a vehicle. Moreover, the present invention relates to a vehicle comprising such a lidar sensor. Finally, the present invention relates to a method for operating such a lidar sensor.

Vehicles having modern assistance systems often comprise lidar sensors, which are used, for example, to detect objects in the surroundings of the vehicle. For this purpose, individual light pulses or laser beams are emitted by the lidar sensor into the surroundings. Lidar sensors for automotive applications typically emit laser beams in a wavelength range not visible to the human eye. This is typically infrared radiation having a wavelength from 800 nm to 2500 nm. If the individual laser beam is reflected back from an object in the surroundings, for example a vehicle, to the lidar sensor, the distance between the lidar sensor and the object can be concluded on the basis of the time-of-flight of the individual laser beam.

A region of the surroundings can thus be scanned by repeatedly emitting the light pulse or the laser beam in different directions. The scanned region of the surroundings is also called the field of view or sensing region of the lidar sensor. The reflection points, thus the points in the surroundings which have reflected the light pulse or laser beam of the lidar sensor, are combined to form a so-called lidar point cloud. This lidar point cloud is used as a representation of the surroundings.

In order to emit the light pulses or laser beams in different directions, to receive them, and to guide them to a detector, various mirror systems are known in conjunction with lidar sensors according to the prior art. The light pulse or laser beam can be guided in a specific direction of the surroundings using such mirror systems. The surroundings are thus scanned using several thousand light pulses or laser beams. For this purpose, it is necessary for the mirror systems to be aligned precisely in the emission direction to receive the laser beams reflected back to the lidar sensor.

Furthermore, lidar sensors which comprise MEMS mirrors or microelectromechanical mirrors are known from the prior art. Multiple microelectromechanical mirrors are often connected in parallel here on the reception side in order to increase the reception area in comparison to a design of a reception unit having one mirror. This approach only functions if the microelectromechanical mirrors are all moved synchronously. The requirements for the synchronous movement are high. They are defined by the beam divergence and the angle resolution. Typical values are in the range of less than 0.025° or in general ¼ of the angle resolution. The microelectromechanical mirrors move, for example, at an angular velocity of 9000°/s. The synchronous movement is to be maintained dynamically here, independently of external effects or the temperature, ambient humidity, vibrations, or mechanical shocks or the like.

Document US 2018/0128920 A1 discloses a lidar system comprising a processor which is configured to control the light propagation of a light source and to scan the field of view by repeatedly moving at least one light deflector, thus a mirror for deflecting individual laser beams, while at least one further light deflector is located in identical alignment.

Furthermore, the lidar system is configured to receive the reflected laser beams by way of at least one further deflector.

It is the object of the present invention to disclose a solution for how a lidar sensor for a vehicle can be designed more robustly. Moreover, a vehicle having such a lidar sensor is to be provided.

This object is achieved by a lidar sensor for a vehicle, by a method, and by a vehicle according to the claimed invention.

A lidar sensor according to embodiments of the invention for a vehicle comprises an optical emitting unit for scanning surroundings of the vehicle within a predetermined sensing region by way of individual laser beams or sequentially emitted light pulses. The lidar sensor for a vehicle additionally comprises an optical receiving unit, which comprises a receiving element for receiving the individual laser beams or light pulses reflected in the surroundings and at least one detector for converting the reflected individual laser beams into an electrical signal. Moreover, the lidar sensor comprises an evaluation unit for determining a representation of the surroundings in the sensing region on the basis of the electrical signal. Furthermore, the receiving element of the lidar sensor comprises at least one optical lens, wherein the at least one optical lens is configured to focus the individual laser beams reflected back from the entire sensing region to the at least one optical lens in a predetermined focal point region. Furthermore, the detector is configured to convert the individual laser beams focused in the focal point region into the electrical signal.

With the aid of the lidar sensor, the individual laser beams reflected back to the lidar sensor can be received without a mechanical alignment of a receiving element and/or parts thereof. The lidar sensor is used to create a representation of the surroundings in the sensing region by way of a lidar point cloud. This representation of the surroundings in the sensing region can be used, for example, for determining a so-called surroundings model. The lidar sensor can preferably be installed behind the windshield or on the roof of the vehicle. The lidar sensor can also, however, be at least partially integrated in a region of the outer skin of the vehicle. The lidar sensor can also be installed distributed over the vehicle.

A light source of the optical emitting unit of the lidar sensor can generate individual laser beams and comprise, for example, a laser diode. The laser beams can be emitted into the surroundings of the vehicle within the predetermined sensing region by way of the optical emitting unit. In this case, the predetermined sensing region is scanned by way of numerous individual laser beams. During the scanning of the predetermined sensing region, for example, laser beams are emitted in horizontal steps of 0.1° and vertical steps of 0.5°. If the predetermined sensing region extends horizontally over 120° and vertically over 10°, up to $1201 \times 21 = 25,221$ individual laser beams can thus be emitted within the predetermined sensing region. In other words, in this example the predetermined sensing region is scanned and sequentially scanned in this case using up to 25,221 individual laser beams.

If the individual laser beam is reflected back to the lidar sensor in the surroundings of the vehicle, it can thus be received by the optical receiving unit. The received individual laser beam reflected back to the lidar sensor is converted here by a detector into an electrical signal. The detector can be designed, for example, as a photodiode or can comprise at least one photodiode. The distance between the lidar sensor and the reflection point can be determined on the basis of the period of time which has passed or the time-of-flight which has passed between emission of the individual laser beam and reception of the individual laser beam reflected back to the lidar sensor. To be able to receive the individual laser beam reflected back to the lidar sensor at all, it is to be ensured that the reception element can guide the individual laser beam reflected back to the lidar sensor to the detector of the optical receiving unit.

It is advantageous if the receiving element of the optical receiving unit does not comprise any mechanical alignable or movable components for guiding the individual laser beam reflected back to the lidar sensor. Mechanically alignable or movable components react sensitively to environmental influences such as vibrations and/or to temperature influences. Vibrations can have a disadvantageous effect on the reception quality of the individual laser beams reflected back to the lidar sensor. The ambient temperature and/or the ambient humidity in the surroundings can moreover influence the movement of the components.

In contrast thereto, it is provided according to embodiments of the invention that the receiving element comprises at least one optical lens which is configured to focus the individual laser beams reflected back to the lidar sensor in the entire sensing region of the lidar sensor in a predetermined focal point region. The focal point or focus of the optical lens is the point in which the beams intersect which are incident in parallel to the optical axis. However, if the beams are not incident in parallel to the optical axis, as can be the case in the case of the lidar sensor having a corresponding sensing region, the beams thus do not always intersect in the same point, but rather in a region around the focal point. This region around the focal point is designated in the present case as the focal point region. The detector of the optical receiving unit is preferably configured such that the individual laser beams focused in the focal point region and reflected back to the lidar sensor can be converted into the electrical signal. A mechanical alignment of the receiving element can thus be omitted. In other words, according to embodiments of the invention a receiving element is used which does not comprise any movable components. Overall, a lidar sensor can thus be provided which is robust with respect to environmental influences.

It is preferably provided that the optical receiving unit comprises at least one fiber-optic cable having a fiber, wherein the at least one fiber-optic cable is arranged in relation to the at least one optical lens such that the individual laser beams focused in the focal point region can couple into the fiber. In particular, the fiber can be a so-called multimode fiber. Inter alia, fiber-optic cables are typically distinguished on the basis of the number of propagation-capable oscillation modes, which are limited by the core diameter of the fiber. The fiber is designed here so that the individual laser beams reflected back to the lidar sensor, which are focused by the at least one optical lens in the focal point region, can couple into the fiber of the fiber-optic cable and can be guided by the fiber-optic cable to the detector.

The at least one optical lens and the at least one fiber-optic cable can be arranged in relation to one another such that the focal point region is associated with the fiber of the fiber-optic cable. The at least one optical lens and the at least one fiber-optic cable can be arranged spaced apart from one another here. For example, the spacing between the at least one optical lens and the at least one fiber-optic cable can correspond to the focal length of the at least one optical lens. Ideally, the cross-sectional area of the fiber corresponds to the area of the focal point region. The cross-sectional area of the fiber can also be greater than the area of the focal point region. The at least one optical lens and the at least one fiber-optic cable can also be connected to one another.

According to embodiments of the present invention, it is thus provided that the individual laser beams reflected back to the lidar sensor, which are focused by the receiving element in the focal point region, are guided by way of a fiber-optic cable by total reflection within the fiber-optic cable to the detector. Since fiber-optic cables have low losses and due to the flexibility of the fiber-optic cable, it is therefore possible to place the detector nearly arbitrarily. It is thus possible that the installation space of the lidar sensor can be designed variably.

It is thus possible that the receiving element and the detector of the receiving unit can be arranged nearly arbitrarily in relation to one another. The receiving element can thus be integrated, for example, in a visually appealing manner in the vehicle without having to retain corresponding installation space in the immediate vicinity of the reception element for the detector.

In a further embodiment, the optical receiving unit of the lidar sensor comprises a plurality of optical lenses and a plurality of fiber-optic cables, wherein each one of the optical lenses is assigned to one of the fiber-optic cables. The effective area of the receiving element of the optical receiving unit can be enlarged by a plurality of optical lenses. The larger the effective area of the receiving element of the optical receiving unit is, the higher the intensity of the received individual laser beam reflected back to the lidar sensor, which is guided to the detector, can be. In other words: the larger the effective area of the receiving element of the optical receiving unit is, the more photons can be received and the better can the individual laser beam reflected back to the lidar sensor be detected by the detector. The area of a single optical lens of the receiving element can be selected here so that the material thickness of the optical lens does not exceed a predetermined limiting value.

The area of the receiving element of the optical receiving unit can be enlarged by the use of a plurality of optical lenses. A fiber-optic cable can be assigned to each optical lens, which is arranged such that the individual laser beams reflected back to the lidar sensor, which are at least partially focused in the respective focal point region, can couple into the fiber of the respective fiber-optic cable. It is thus possible that the largest possible number of photons can be received by the receiving element of the optical receiving unit and guided to the detector. It is thus ensured that a reflection at an object in the surroundings of the vehicle can be reliably recognized although receiving elements having a small area are used. The electromagnetic radiation focused by each individual optical lens of the receiving element, which originates from the individual laser beams reflected back to the lidar sensor, can be used to thus in total detect overall a reflection in the surroundings of the vehicle.

In addition, it is possible to use a plurality of optical lenses and a plurality of fiber-optic cables so that one of the optical lenses only covers a subregion of the predetermined sensing region. In their entirety, the plurality of the optical lenses can cover the entire predetermined sensing region. It can thus be ensured that a large predetermined sensing region can be covered by the receiving element although a single optical lens cannot focus the individual laser beam reflected back to the lidar sensor in a corresponding focal point region, so that the focused laser beam can couple into the fiber of the respective fiber-optic cable.

The plurality of optical lenses can be arranged adjacent to one another in multiple columns and/or multiple rows. A lidar sensor having such an arrangement can comprise, for example, between two and several hundred optical lenses. The optical lenses can be manufactured from a glass or from a plastic. In particular, the optical lenses can be designed as micro-lenses or can be produced by way of a micro-technical method.

In one advantageous embodiment, the detector of the optical receiving unit comprises a plurality of photodetectors, wherein each one of the photodetectors is assigned to one of the fiber-optic cables. Such a design is advantageous in particular if the plurality of optical lenses of the receiving element is used such that individual lenses only cover a subregion of the predetermined sensing region. For example, the predetermined sensing region can be 120° and the receiving element can comprise two optical lenses, which each cover a range of 60°. In this case, one photodetector can be assigned in each case to one optical lens or one of the fiber-optic cables. In this meaning, it is also conceivable that the optical lenses are aligned so that their optical axes are not in parallel to one another in pairs.

The photodetectors and the fiber-optic cables can be arranged in relation to one another such that the laser beams guided in the fiber-optic cable reach the photodetector. Here, the respective fiber-optic cables and the photodetectors can be arranged spaced apart from one another and/or can be connected to one another.

In a further advantageous embodiment, at least two of the fiber-optic cables are spliced and the spliced fiber-optic cables are assigned to a photodetector of the detector of the receiving unit. In other words, at least two of the fiber-optic cables are connected to one another and their common end is assigned to a photodetector of the detector of the receiving unit. Such an embodiment is also called a fiber-coupled photodetector. Such an embodiment is reasonable if a plurality of optical lenses is used to increase the effective overall area of the receiving element. The photons, received by each optical lens, of the individual laser beams reflected back to the lidar sensor can be summed such that the intensity increases and an element or an object of the surroundings can be detected more reliably. The more photons are guided to the photodetector, the more reliably can the individual laser beams reflected back to the lidar sensor be converted into an electrical signal and the more reliably can an element or an object of the surroundings be detected.

Overall, a plurality of optical lenses can thus be used to increase the reception performance and/or to cover individual subregions of the predetermined sensing region. For example, the receiving element can comprise four optical lenses and the detector can comprise two photodetectors, for example. Each two of the fiber-optic cables assigned to the four optical lenses are spliced. In other words, each two of the total of four fiber-optic cables are connected to one another and their common end is assigned to one of the photodetectors of the detector in each case. The four optical lenses can now be arranged such that two different subregions of the predetermined sensing region are covered. Here, in each case, two of the optical lenses cover the same subregion, so that the effective total area of the receiving element for this subregion is given by two of the four optical lenses. In total, in this example four optical lenses will thus be used to increase the effective overall area of the receiving element and to cover individual subregions of the predetermined sensing region.

Furthermore, it is advantageous if the at least one optical lens of the receiving element of the lidar sensor is designed as an optical converging lens having a numeric aperture greater than 0.25. The numeric aperture characterizes the ability of an optical lens to focus light. In air, the numeric aperture is always a value between 0 and 1. The greater the numeric aperture is, the better beams which are not incident parallel to the optical axis of the optical lens can be focused in the focal point. In other words, this means that a large numeric aperture guarantees the smallest possible focal point region. A numeric aperture of 0.25 permits a predetermined sensing region of approximately 30° or approximately +15°. Alternatively thereto, a numeric aperture of 0.25 permits a subregion of the predetermined sensing region of approximately 30° to be covered. If the individual laser beams reflected back to the lidar sensor are incident on the receiving element in the angle range of approximately +15°, these are thus focused in the focal point of the at least one optical lens.

A further embodiment of the lidar sensor provides that the plurality of the optical lenses of the receiving element is arranged spherically or cylindrically at least in regions. In each case one directional vector of the optical axis of the plurality of the optical lens and a normal vector of a sphere or a cylinder can therefore be collinear. In other words, the optical lenses can thus be arranged adjacent to one another on a spherical or cylindrical surface. The optical lenses can be arranged on a base body or carrier element transparent to the laser beams. This base body can be designed spherically or cylindrically. In particular, as a result the respective focal point regions are also arranged spherically or cylindrically. If a plurality of optical lenses is used in addition for a specific subregion of the predetermined sensing region, only the respective focal point regions can thus also be arranged spherically or cylindrically.

This has the advantage over a planar arrangement that a larger predetermined sensing region is possible. A cylindrical arrangement of the plurality of the optical lenses of the receiving element is advantageous in particular if the predetermined sensing region of the lidar sensor comprises a large horizontal angle range. A spherical arrangement of the plurality of the optical lenses of the receiving element of the lidar sensor is reasonable in particular if the predetermined sensing region also comprises a large vertical angle range in addition to a large horizontal angle range.

In a further embodiment, the optical emitting unit controls the direction of the individual laser beams by way of a microelectromechanical mirror or an electronic beam pivot. Microelectromechanical mirrors, also called MEMS mirrors, are used to guide the laser beam generated by a light source horizontally and vertically. Individual laser beams can thus be emitted into the entire predetermined sensing region. The control of the individual laser beams can also be carried out by way of an electronic beam pivot. By way of a phase-controlled field, also called an optical phased array, the direction of the individual laser beams can be electronically controlled. No information on the direction of the individual laser beams which are reflected back to the lidar sensor is present within the receiving unit. Therefore, the evaluation unit also requires, in addition to the electrical signal, information about the emitting direction of the currently emitted individual laser beam to determine the representation of the surroundings in the sensing region.

A vehicle according to embodiments of the invention comprises a lidar sensor according to embodiments of the invention. The vehicle can be designed in particular as a passenger vehicle. The lidar sensor can be arranged, for example, on the roof of the vehicle or behind the windshield of the vehicle. Alternatively thereto, the lidar sensor can also be at least partially integrated in the outer skin of the vehicle in a visually appealing manner. The vehicle can also comprise multiple lidar sensors. The vehicle preferably comprises driver assistance systems which use the representation of the surroundings of the vehicle determined by the lidar sensor to control the longitudinal and/or lateral guidance of the vehicle.

A method according to embodiments of the invention for operating a lidar sensor of a vehicle is used for scanning surroundings of the vehicle within a predetermined sensing region by way of individual laser beams by way of an optical emitting unit. The method comprises receiving the individual laser beams reflected in the surroundings and comprises converting the reflected individual laser beams into an electrical signal by way of an optical receiving unit. Furthermore, the method comprises determining a representation of the surroundings in the sensing region on the basis of the electrical signal by way of an evaluation unit. Moreover, it is provided that the individual laser beams reflected back from the entire sensing region are focused in a predetermined focal point by way of at least one optical lens of the receiving element. It is also provided that the individual laser beams focused in the focal point region are converted by way of a detector into the electrical signal.

The embodiments presented with respect to the lidar sensor according to the invention and their advantages apply accordingly to the vehicle according to embodiments of the invention and to the method according to embodiments of the invention for operating the lidar sensor.

Further features of the invention result from the claims, the figures, and the description of the figures. The features and combinations of features mentioned above in the description and the features and combinations of features mentioned hereinafter in the description of the figures and/or solely shown in the figures are usable not only in the respectively specified combination but also in other combinations or alone without departing from the scope of the invention.

The invention will now be explained in more detail on the basis of preferred exemplary embodiments and with reference to the appended drawings.

DETAILED DESCRIPTION OF THE DRAWINGS

In the figures, identical or functionally identical elements are provided with the same reference signs.

Figure 1:
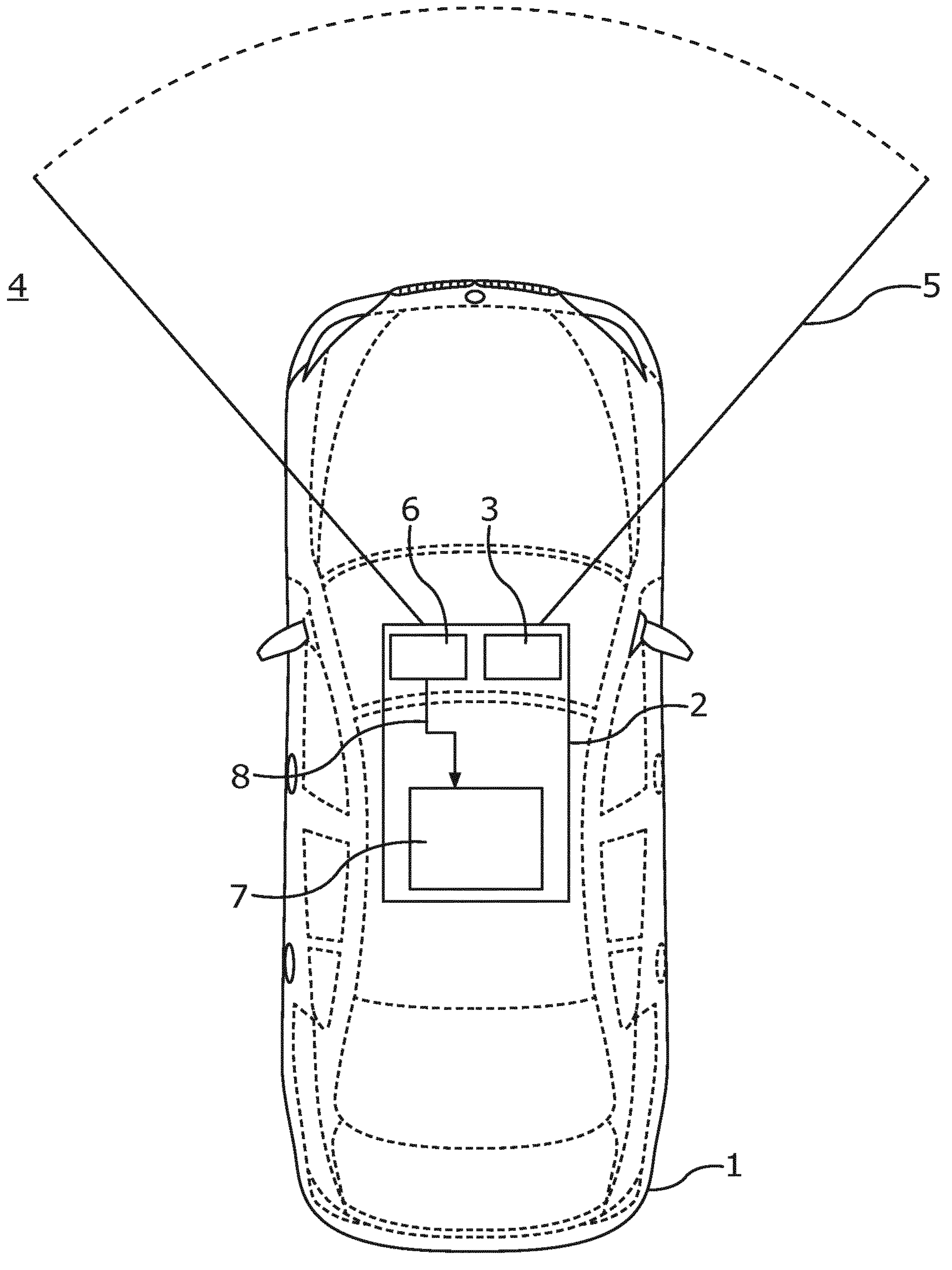
FIG. 1 shows a schematic representation of a vehicle which comprises a lidar sensor.

FIG. 1 shows a schematic representation of a vehicle 1, which comprises a lidar sensor 2. The vehicle 1 is designed as a passenger vehicle and is shown in a top view. The lidar sensor 2 comprises an optical emitting unit 3, which is used to scan surroundings 4 of the vehicle 1 within a predetermined sensing region 5 by way of individual laser beams. The lidar sensor 2 comprises an optical receiving unit 6, which is used to receive the individual laser beams 10 reflected back from an object in the surroundings 4 to the lidar sensor 2 and to convert them by way of a detector into an electrical signal. Furthermore, the lidar sensor 2 comprises an evaluation unit 7 for determining a representation of the surroundings 4 in the sensing region 5 on the basis of the electrical signal. The electrical signal is transmitted from the optical receiving unit 6 to the evaluation unit 7 by way of a fiber-optic cable 8.

Figure 2:
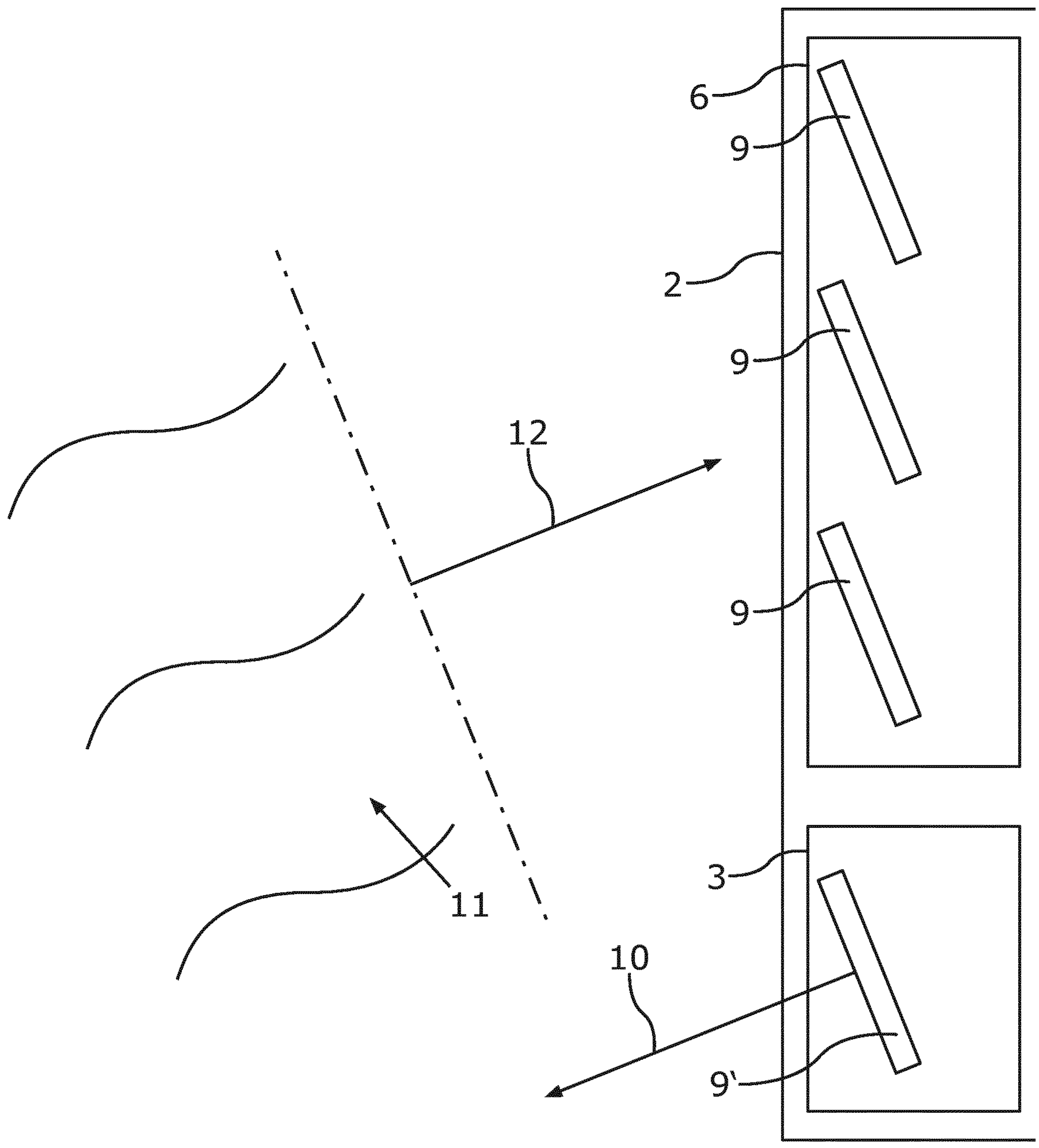
FIG. 2 shows a schematic representation of a lidar sensor according to the prior art, comprising an optical emitting unit and an optical receiving unit.

FIG. 2 shows a schematic representation of a lidar sensor 2 according to the prior art. The lidar sensor 2 comprises an optical receiving unit 6, the receiving elements of which comprise three microelectromechanical mirrors 9 in the present example. The optical emitting unit 3 also comprises a microelectromechanical mirror 9' for controlling the direction of the emitted individual laser beams 10. The microelectromechanical mirrors 9 of the optical receiving unit 6 are aligned or synchronized identically to the microelectromechanical mirror 9' of the optical emitting unit 3. If the individual laser beam 10 is reflected from an object in the surroundings 4 of the vehicle back to the lidar sensor 2, the planar wavefront 11 of the laser beam 12 reflected back to the lidar sensor is thus incident on the microelectromechanical mirrors 9 of the optical receiving unit 6. From there, the laser beam 12 reflected back to the lidar sensor 2 is guided to the detector of the receiving unit 6.

The distance to an object in the surroundings 4, which has reflected the individual laser beams 10, can be determined on the basis of the time-of-flight of the individual laser beams 10 and the time-of-flight of the laser beams 12 reflected back to the lidar sensor. Moreover, the angle of the object in the surroundings 4 which reflects the laser beams 10 can be determined on the basis of the current alignment of the microelectromechanical mirrors 9. A representation of the surroundings 4 in the sensing region 5 can thus be determined.

The current prior art of such a lidar sensor 2 which uses microelectromechanical mirrors 9, 9' has the disadvantage that the microelectromechanical mirrors 9, 9' are sensitive with respect to vibrations in the surroundings 4 of the vehicle. Moreover, the respective microelectromechanical mirrors 9, 9' have to be moved synchronously. Furthermore, position monitoring is required per microelectromechanical mirror 9, 9'.

Figure 3:
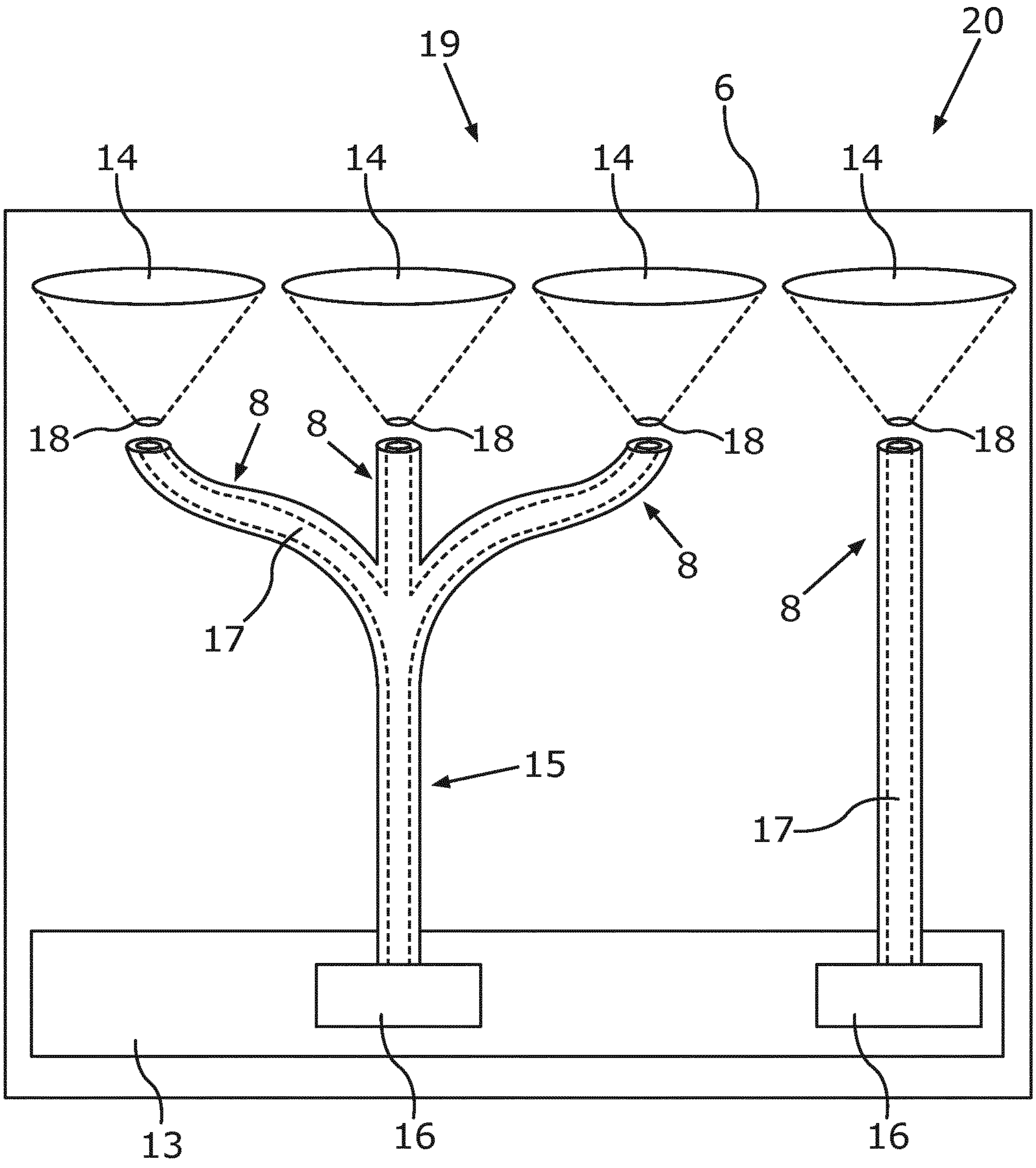
FIG. 3 shows a schematic representation of an optical receiving unit, comprising a plurality of optical lenses as receiving elements and partially embodied having spliced fiber-optic cables.

FIG. 3 shows a schematic representation of the optical receiving unit 6 of a lidar sensor 2 according to an embodiment of the invention. The optical receiving unit 6 of the lidar sensor 2 comprises a detector 13. The detector 13 comprises two photodetectors 16 in the present example. The optical receiving unit 6 moreover comprises four optical lenses 14. Three of the optical lenses 14 receive the beams 12 reflected back to the lidar sensor 2 from a subregion 19 of the predetermined sensing region 5. One of the four optical lenses 4 receives the beams reflected back to the lidar sensor 2 from a subregion 20. The subregion 19 and the subregion 20 cover the entire predetermined sensing region 5.

The received beams reflected back to the lidar sensor 2 are focused by the optical lenses 14 in their respective focal point region 18. The focal point or focus of the optical lens is the point at which the beams intersect which are incident parallel to the optical axis. However, if the beams are not incident parallel to the optical axis, as can be the case in the case of the lidar sensor having a corresponding predetermined sensing region, the beams thus do not always intersect at the same point, but rather in a region around the focal point. This region around the focal point is designated in the present case as the focal point region. The distance between the focal point region 18 and the respective optical lens 14 corresponds to the focal length of the respective optical lens 14. The optical lens 14 and the assigned fiber-optic cable 8 are arranged spaced apart from one another in the present example. The distance between the optical lens 14 and the assigned fiber-optic cables 8 or their fibers 17 approximately corresponds to the focal length of the optical lens 14. The cross-sectional area of the fiber 17 ideally corresponds to the area of the focal point region 18. The cross-sectional area of the fiber 17 can also be larger than the area of the focal point region 18.

One fiber-optic cable 8 is assigned to each of the optical lenses 14. Each fiber-optic cable 8 comprises a fiber 17, which guides the received individual laser beams 12 reflected back to the lidar sensor 2 to the detector 13. In the example, three of the fiber-optic cables 8 are spliced. The spliced fiber-optic cables 15 are assigned to a photodetector 16 of the detector 13. The effective reception surface of the receiving element of the optical receiving unit 6 can be enlarged by the plurality of the optical lenses 14, the assigned fiber-optic cables 8 of which are spliced. Moreover, a further optical lens 14 is used to cover a subregion 20 of the predetermined sensing region 5. This optical lens 14 is directly coupled with a photodetector 16 via a fiber-optic cable 8. It is thus conceivable, for example, that the optical lenses 14, the assigned fiber-optic cables 8 of which are spliced, cover a subregion 19 of the predetermined sensing region 5 and the missing subregion of the predetermined sensing region is covered by a further optical lens 14.

The optical receiving unit 6 can be embodied so that each individual one of the optical lenses 14 is directly coupled using a fiber-optic cable 8 in each case with a photodetector 16. The optical receiving unit 6 can also only comprise spliced fiber-optic cables 15. Furthermore, the optical receiving unit 6 can comprise arbitrary combinations of fiber-optic cables 8 and spliced fiber-optic cables 15. In the example of FIG. 3, the optical lenses 14 are arranged in a planar manner. It can furthermore be provided that the optical lenses 14 are arranged cylindrically or spherically.

The invention claimed is:

1. A lidar sensor for a vehicle, the lidar sensor comprising:

an optical emitting unit for scanning surroundings of the vehicle within a predetermined sensing region by individual laser beams;

an optical receiving unit comprising a receiving element for receiving the individual laser beams reflected by the surroundings and a detector for converting the reflected individual laser beams into an electrical signal; and an evaluation unit for determining a representation of the surroundings in the predetermined sensing region based on the electrical signal, wherein:

the receiving element comprises a plurality of optical lenses and a plurality of fiber-optic cables, wherein each one of the optical lenses is assigned to a respective one of the fiber-optic cables, and wherein each one of the optical lenses is configured to focus individual laser beams reflected by a portion of the predetermined sensing region to the respective optical lens in a respective focal point region of the respective optical lens, the detector is configured to convert the individual laser beams focused in each respective focal point region of each respective optical lens into the electrical signal, the detector comprises a plurality of photodetectors, at least two of the fiber-optic cables are spliced, and the spliced optical fibers are assigned to a photodetector of the detector, a first group of the optical lenses covers a first subregion of the predetermined sensing region, wherein each optical lens in the first group is assigned to one of the spliced optical fibers, and at least one additional optical lens covers a second subregion of the predetermined sensing region.

2. The lidar sensor according to claim 1, wherein:

each one of the fiber-optic cables has a fiber, and each one of the optical lenses is arranged in relation to the respective one of the fiber-optic cables such that the individual laser beams focused in the respective focal point region of the respective optical lens couple into the fiber of the respective one of the fiber-optic cables.

3. The lidar sensor according to claim 1, wherein:

each one of the optical lenses is configured as an optical converging lens having a numeric aperture greater than 0.25.

4. The lidar sensor according to claim 1, wherein:

the plurality of the optical lenses are arranged spherically or cylindrically at least in regions.

5. The lidar sensor according to claim 1, wherein:

the optical emitting unit controls a direction of the individual laser beams by way of a microelectromechanical mirror or an electronic beam pivot.

6. A vehicle comprising the lidar sensor according to claim 1.

7. The vehicle according to claim 6, wherein the vehicle is a passenger vehicle.

8. A method for operating a lidar sensor of a vehicle, the method comprising:

scanning surroundings of the vehicle within a predetermined sensing region by individual laser beams by using an optical emitting unit;

receiving the individual laser beams reflected by the surroundings and converting the reflected individual laser beams into an electrical signal by an optical receiving unit; and determining a representation of the surroundings in the predetermined sensing region based on the electrical signal by an evaluation unit, wherein:

the individual laser beams reflected by the entire predetermined sensing region are focused in a predetermined focal point region by at least one optical lens of the receiving element, first individual laser beams focused by a first group of optical lenses are received from a first subregion of the predetermined sensing region, the first individual laser beams focused by the first group of optical lenses are fed via respectively assigned, spliced optical fibers to a first photodetector of a detector, the first individual laser beams fed to the first photodetector via the spliced optical fibers are converted by the first photodetector into a first electrical signal, second individual laser beams focused by at least one additional optical lens are received from a second subregion of the predetermined sensing region, and the second individual laser beams focused by the at least one additional optical lens are detected by a second photodetector of the detector and are converted into a second electrical signal.

* * * * *